United States Patent Office 3,491,038
Patented Jan. 20, 1970

3,491,038
CLEAR, HIGHLY DURABLE CELLULOSIC FILM CONTAINING ELASTOMERIC PARTICLES
Henry H. Sineath, John T. Massengale, and Frank E. Carevic, West Chester, Pa., assignors to FMC Corporation, Philadelphia, Pa., a corporation of Delaware
No Drawing. Filed Oct. 22, 1965, Ser. No. 502,292
Int. Cl. C08b 23/00
U.S. Cl. 260—17
10 Claims

ABSTRACT OF THE DISCLOSURE

A highly durable, clear cellulose film containing dispersed, fine elastomeric particles, and a method for preparing the same, are disclosed herein.

---

Cellulosic films, such as regenerated cellulose, have a tendency to lose flexibility and become embrittled at low temperatures, particularly, under low humidity conditions. Increased plasticizer helps overcome this problem but the amounts necessary to improve this condition produce other film problems. Whichever method is used to produce a more flexible and durable cellulose film, the high clarity of the film must be preserved.

It is an object of this invention to provide a method of preparing a highly durable and flexible, clear cellulosic film.

It is a further object of this invention to provide a clear cellulosic film having improved durability.

These and other objects are achieved in accordance with this invention which comprises extruding an alkaline cellulosic solution having uniformly dispersed therein from about 0.4 to about 6.0% based on the weight of the solution of submicron size elastomeric resin particles at least a major proportion of which are under 2000 angstroms, preferably 1000 angstroms, and from about 1 to about 25% based on the weight of the resin of an alkaline stable, deflocculating, surface-active agent through a film-forming orifice into an acid coagulating bath, removing the formed film from the bath, washing, and drying the film.

The invention also comprises a clear, cellulosic film containing uniformly dispersed therein from about 10 to about 50% based on the weight of the cellulose of submicron size elastomeric resin particles at least a major proportion of which are under 2000 angstroms.

The elastomeric resins of this invention include finely-divided natural and synthetic rubber. For example, natural rubber includes caoutchouc, balata, gutta percha, pale crepe and the like while synthetic rubber includes, for example, polymers of butadiene, 2-chlorobutadiene-1,3, isobutylene, vinyl pyridine, isoprene and interpolymers of these and similar materials with each other or with interpolymerizable monomers including, for example, styrene, acrylonitrile methacrylonitrile, alkyl acrylates and methacrylates, alkyl substituted vinyl pyridines and the like.

The elastomeric resin is generally available in the prescribed particle size in the form of a latex wherein the resin comprises from about 10 to 60% by weight of the aqueous system.

A major proportion of the submicron size elastomeric resin particles must be under 2000 angstroms in order to provide a film having an acceptable haze value or clarity. It is preferred that a major proportion of the particles be under 1000 angstroms in size although a sizable percentage of the particles may be as large as 2000 angstroms with a small percentage exceeding this size.

Available resin latexes contain resin particles having a diameter at their largest dimension of as low as about 500 angstroms, however, smaller particle sizes down to where the particles are still discernable as solid matter in an electron microscope are included in the invention.

In the preferred method of this invention, a latex containing the finely-divided elastomeric resin and the specified surface-active agent is injected into the stream of film-forming alkaline cellulosic solution just prior to extrusion of the solution into the coagulating bath. The rate of injection is controlled to provide the desired amount of resin in the finished film. Thus, the latex is injected at a rate to provide from about 0.4 to about 6.0%, preferably from 1.2 to 2.0% of elastomeric resin based on the weight of the alkaline cellulosic solution. The film-forming cellulosic solution, from a practical standpoint, contains from about 4 to about 12, preferably about 8 wt. percent of cellulose. Therefore, the coagulated cellulosic film will contain from about 10 to about 50%, preferably about 15 to 25% by weight of dispersed, finely-divided elastomer, as required.

Ordinarily, when a latex containing small size resin particles is mixed in an alkaline solution, the small particles tend to flocculate or come together to form larger particles. When this occurs during the process of manufacturing cellulosic films, the resulting films are hazy or delustered and not suitable for many packaging uses. To obtain clear films with the accompanying durability afforded by the presence of the elastomer, the latex particles must not be above the prescribed dimension and must remain this size. Flocculation of the particles appreciably reduces film clarity and, since flocculation invariably occurs when the latex is mixed with the alkaline solution, attempts were made to stabilize the small resin particles therein. It was found that certain surface-active agents would produce the desired results. Excellent results were obtained with surface-active agents which were themselves stable in an alkaline solution and which had a defloccu-lating action on the latex particles in the alkaline cellulosic medium.

Moilliet et al., in their 1961 edition of "Surface Activity," Van Nostrand Co., Inc., have stated, "If the tendency for spontaneous mutual adhesion to occur among dispersed particles in a system is diminished by the addition of a surface-active agent, we can say that it has a 'deflocculating' action." The authors also point out that these surface-active agents can increase the degree of deflocculation of dispersed systems in one of several ways. Without a discussion of the various effects of surface-active agents on dispersions, it will be sufficient to say, for the purpose of this invention, that any type of deflocculating surface-active material which is stable in an alkaline cellulosic solution is useful. The amount of surface-active agent broadly ranges between about 1 and about 25%, however, it is preferred that from about 5 to 20%, based on the resin weight, of surface-active agent, be employed.

Examples of some surface-active agents, including their tradenames, which are stable in an alkaline solution and which have a deflocculating action on dispersed particles in viscose include the following:

Sodium salt of alkylphenoxy-polyoxyethylene ethyl ester of phosphoric acid (Gafac RE–960)
Alkylphenoxy-polyoxyethylene ethanol (Igepal CO–850; Igepal CO–530)
Polyoxyethylene alkylamine (Atlas G–3780A)
Sodium tridecylethoxylate sulfate (Sipex E St)
Dodecylphenyl polyethylene glycol ether (Tergitol Nonionic 12–P–9)
Alkaryl polyether alcohol (Surfonic N–60 and Triton X–405)
Condensate of ethylene oxide with a hydrophobic base formed by condensing propylene oxide with propylene glycol (Pluronic L–64)

In general, nonionic surface-active agents have been found effective, some anionic surface-active agents are effective, and cationic agents are ineffective deflocculators in alkaline cellulosic solutions.

The cellulosic films of this invention include any films formed from an alkaline cellulosic solution preferably including viscose and hydroxyalkyl cellulose ether film-forming solutions. These solutions generally contain from about 2 to 10% by weight of an alkali metal hydroxide and from about 4 to 12% by weight of cellulose in derivatized form. Viscose, because of the commercial importance of films formed therefrom, is the more preferred alkaline cellulose solution of this invention.

The film-forming solutions are coagulated in aqueous acid baths. Viscose coagulating baths are well known in the art and may contain combinations of sulfuric acid, sodium and ammonium sulfate, phosphoric acid, disodium phosphate and the like. Coagulating baths for cellulose ether solutions may contain similar compounds as viscose coagulating baths but preferably contain a high proportion of the phosphate radical.

In the preferred embodiment of this invention, the cellulosic film is plasticized with a conventional water-soluble cellulosic softening agent. The plasticizer employed is usually glycerine in an amount ranging from about 5 to 28% based on the weight of the cellulose, however, other plasticizers may be used including, for example, ethylene glycol, propylene glycol, diethylene glycol, triethylene glycol, sugars, hexitols, calcium chloride, triethanolamine, carbamide and mixtures thereof.

The plasticizer is generally incorporated in the formed film by mixing it with water and passing the film through a bath thereof. Water-soluble anchoring agents, for promoting adhesion of coatings to the film, may also be included in the plasticizer bath.

This invention also includes cellulosic films having thin film-forming resin coatings including, for example, nitrocellulose, polyethylene, vinylidene chloride copolymers, vinyl chloride-vinyl acetate copolymers, vinyl chloride-alkyl acrylate copolymers, polyvinyl chloride and the like. Regenerated cellulose films spun in accordance with this invention may develop varying degrees of surface haze probably due to migration of resin particles to the surface. After coating, for example, with one of the above-mentioned resins, this surface haze disappears to provide a perfectly clear composite film.

The following example is set forth to demonstrate this invention.

EXAMPLE

A latex, comprising an aqueous dispersion of 20% by weight of submicron size particles of an elastomeric resin copolymer of 76.5% butadiene and 23.5% styrene having an average particle size range of about 600 to 800 angstroms and 20%, based on the resin weight, of the sodium salt of alkylphenoxy polyoxyethylene ethyl ester of phosphoric acid (Gafac RE–960) was uniformly dispersed in the viscose stream of a film-forming apparatus by means of an inline blender. The injection rate was regulated to obtain a film containing about 18 grams of elastomeric resin per 100 grams of cellulose. The viscose, containing about 8% cellulose, was extruded in the form of a film into an aqueous coagulating and regenerating bath containing 10% sulfuric acid and 30% sodium sulfate, in the usual manner of forming regenerated cellulose film. After removal from the coagulating bath, the film was run through an aqueous bath containing about 9% of glycerine plasticizer, and then dried.

The finished film was 0.81 mil thick and had an elastomeric resin content of 17.6 grams and a glycerine content of 28.7 grams per 100 grams of cellulose. The cellulose film was coated with a thin layer of nitrocellulose and this composite sheet was rated as clear as conventional nitrocellulose coated regenerated cellulose film.

Durability of the film was measured in a test procedure which consisted of forming bags of the film to be tested and filling the bags with a specified weight of lead shot. The bag was then placed in a wide-mouthed jar containing a baffle positioned so that when the jar was placed on a set of ball mill rolls, the bag was repeatedly lifted and dropped during the rotation of the rolls. The time was measured from the start of rotation of the rolls to the point at which the bag ruptured. The closed jar permitted testing of films at controlled moisture content and temperaure. In this test procedure the uncoated test film at a relative humidity of 43% and temperature of 0° C. showed an improvement in durability over conventional regenerated cellulose film of the same thickness and plasticizer content of 152%; at 11% R.H. and 0° C. the improvement was 264%.

A flexibility test procedure was also used to determine this property of the resin loaded film. This test consisted of placing a six inch by ten inch film sample in a double jaw assembly which was capable of a straight line reciprocating motion. When the reciprocating action was begun the film was subjected to a reproducible flexing action with each stroke. The number of strokes necessary to produce failure or tear in the sample was reported as the flex value. The test was conducted under controlled temperature and humidity conditions.

At 0° C. and 43% relative humidity the flex value for the test film was 260 as compared to 80 for a control film sample. At 0° C. and 11% relative humidity, the values were 17 for the test film and 9 for the control sample.

The above example indicates that the method of forming cellulose films of this invention provides clear film of improved durability and flexability.

Other cellulose films were similarly prepared containing finely-divided natural rubber and other synthetic elastomer resins to provide films of improved durability and flexibility. Films prepared with larger particle size resin dispersed therein or with surface-active agents which did not exercise a deflocculating action produced film which was undesirably hazy even after coating.

Various changes and modifications may be made practicing the invention without departing from the spirit and scope thereof and, therefore, the invention is not to be limited except as defined in the appended claims.

We claim:

1. A method of producing highly durable, clear, cellulosic film which comprises extruding an alkaline cellulosic solution having uniformly dispersed therein from about 0.4 to about 6.0%, based on the weight of the solution, of submicron size natural or synthetic rubber particles at least a major proportion of which are under 2000 angstroms and from about 1 to about 25%, based on the weight of the resin of an alkaline stable, deflocculating, surface-active agent through a film-forming orifice into an acid-coagulating bath, removing the formed film from the bath, washing, and drying the film.

2. The method of claim 1 wherein the natural or synthetic rubber particles are incorporated in the alkaline cellulosic solution by mixing a latex containing from about 10 to about 60% by weight of said particles and the surface-active agent with said alkaline cellulosic solution prior to extrusion.

3. The method of claim 1 wherein the alkaline cellulosic solution is viscose and a major proportion of the resin particles are under 1000 angstroms.

4. The method of claim 3 wherein the natural or synthetic rubber is a copolymer of at least 50% butadiene and styrene and the surface-active agent is the sodium salt of an alkyl phenoxypolyoxyethylene ethyl ester of phosphoric acid.

5. The method of claim 3 wherein the formed film is treated to incorporate from about 5 to about 28%, based on the weight of the cellulose in the film, of glycerine therein.

6. A clear, film of a material selected from the group consisting of a hydroxyalkyl cellulose ether and regenerated cellulose having uniformly dispersed therein from about 10 to about 50%, based on the weight of the cellulose in the film, of submicron size natural or synthetic rubber particles at least a major proportion of which are under 2000 angstroms.

7. The film of claim 6 wherein the cellulosic material is regenerated cellulose.

8. The film of claim 7 containing from about 5 to about 280%, based on the weight of the cellulose, of glycerine.

9. The film of claim 7 wherein the natural or synthetic rubber is a copolymer of at least 50% butadiene and styrene and at least a major proportion of the resin particles are under 1000 angstroms.

10. The film of claim 6 having a film-forming resin coating on at least one surface thereof.

References Cited

UNITED STATES PATENTS

| | | | |
|---|---|---|---|
| 2,864,783 | 12/1958 | Cornwell | 260—17 |
| 1,867,188 | 7/1932 | Stockly et al. | 264—191 XR |
| 1,875,185 | 8/1932 | Stockly et al. | 264—191 XR |
| 2,060,786 | 11/1936 | Bley | 106—40 |
| 3,373,237 | 3/1968 | Mihalik et al. | 264—316 |
| 3,235,642 | 2/1966 | Blomberg | 264—182 |

FOREIGN PATENTS 491,199  8/1938  Great Britain.

OTHER REFERENCES

Reinhold, Condensed Chem. Dict., 5th ed., pp. 1159, 526–527.

General Aniline and Film Corp. Catalog AP–137–2, p. 10, published 1964.

WILLIAM H. SHORT, Primary Examiner

E. NIELSEN, Assistant Examiner

U.S. Cl. X.R.

106—168; 260—17.4, 742; 264—191